United States Patent
Crenshaw

(10) Patent No.: US 7,660,431 B2
(45) Date of Patent: Feb. 9, 2010

(54) IMAGE RECOGNITION FACILITATION USING REMOTELY SOURCED CONTENT

(75) Inventor: James E. Crenshaw, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 487 days.

(21) Appl. No.: 11/013,865

(22) Filed: Dec. 16, 2004

(65) Prior Publication Data

US 2006/0133642 A1    Jun. 22, 2006

(51) Int. Cl.
*G06K 9/00* (2006.01)
(52) U.S. Cl. .................. 382/100; 382/118; 382/181
(58) Field of Classification Search .......... 382/100, 382/118, 181
See application file for complete search history.

(56) References Cited

U.S. PATENT DOCUMENTS

| 5,859,972 | A  | * | 1/1999 | Subramaniam et al. ..... 709/203 |
| 6,377,296 | B1 |   | 4/2002 | Zlatsin et al. |
| 6,738,631 | B1 |   | 5/2004 | Adler et al. |
| 6,775,411 | B2 | * | 8/2004 | Sloan et al. .............. 382/224 |
| 7,020,696 | B1 | * | 3/2006 | Perry et al. ............. 709/223 |
| 7,099,505 | B2 | * | 8/2006 | Li et al. ................ 382/159 |
| 2002/0069218 | A1 |   | 6/2002 | Sull et al. |
| 2003/0200080 | A1 |   | 10/2003 | Galanes et al. |
| 2004/0120581 | A1 |   | 6/2004 | Ozer et al. |
| 2004/0147840 | A1 |   | 7/2004 | Duggirala et al. |

FOREIGN PATENT DOCUMENTS

| WO | WO 01/63560 A1 | 8/2001 |
| WO | WO 03/094545 A1 | 11/2003 |

OTHER PUBLICATIONS

Zuech, Smart Cameras vs. PC-Based Machine Vision Systems; May 7, 2003, Automated Imaging Association, pp. 1-3.*

Structural Informatics Group, "The Digital Anatomist Information System", Department of Biological Structure, [online] Retrieved from the Internet on May 3, 2005 at URL: http://sig.biostr.washington.edu/projects/da /, University of Washington, 1999,3 pages.

* cited by examiner

*Primary Examiner*—John B Strege
(74) *Attorney, Agent, or Firm*—Larry T. Cullen

(57) ABSTRACT

Upon determining (201) a need for image recognition facilitation content, a corresponding process (200) first determines (202 and 203) whether adequate local resources are available. When true, those local resources are used (204) to facilitate the desired image recognition. When false, however, one or more remote resources are accessed (205) and supplemental image recognition facilitation content is received (206) and locally used (207) to effect the desired image recognition process. Local memory management can optionally comprise, if desired, deletion (208) of some (or all) locally stored image recognition facilitation content and/or storage (209) of the remotely sourced image recognition facilitation content.

12 Claims, 3 Drawing Sheets

IMAGE RECOGNITION FACILITATION USING REMOTELY SOURCED CONTENT

TECHNICAL FIELD

This invention relates generally to image recognition and more particularly to the provision of image recognition facilitation content.

BACKGROUND

Image recognition comprises an area of present interest and study. In general, image recognition relates to the analysis of a captured image and more particularly to the recognition of some or all of the contents of that captured image. For example, if a given captured image comprises an image of a room containing various objects, image recognition might be used to recognize one or more of those objects and/or to recognize the room itself for what it is.

Such techniques hold considerable potential for widespread application. So-called smart cameras (i.e., an image capture platform that also incorporates a native capability to implement computer vision algorithms to facilitate recognition of the contents of captured images) could be used, for example, as an important element of a vehicle collision avoidance system, an airport security system, and so forth. Realization of this potential, however, is likely dependent, at least in part, upon an ability to effect such recognition accurately and timely. A collision avoidance system, for example, that cannot readily discern a difference between a child on a tricycle and a piece of cardboard blowing in the wind might pose a concern.

Many different approaches exist regarding the nature and operation of the recognition engine itself and many more will likely be developed in the future. In general, however, it may be observed that essentially all such approaches make use of image recognition facilitation content to effect their purpose. This content can comprise, for example, object models that correspond to various objects to be recognized when present in a captured image (where present object models form a comparative basis for recognizing and identifying corresponding objects and often comprise, at least in part, characterizing geometric property information and interaction properties information (such as whether a given object tends to move, and if so, with what degree of relative movement with respect to other objects)). Other examples of such content exist as well and/or will likely be developed in the future. For example, so-called classifiers (which some skilled practitioners might consider as being a kind of (or a variant of) a model) that tend to be more statistical in nature are also relevant to these teachings and may also serve as image recognition facilitation content.

Unfortunately, such content requires corresponding storage space. Though memory capacity and management continues to improve, it may not be possible to include a memory of sufficient capacity and/or capability in the near future that can contain all possible and/or available image recognition facilitation content as may exist at any given time.

Furthermore, even if such a memory did exist, sheer capacity in and of itself will not necessarily address all relevant concerns. In particular, new objects to be recognized occur on a regular basis (with illustrative examples including new personal objects, furniture, vehicles, architectural objects and features, and specific persons, to name a few). It is also likely that some existing objects to be recognized may assume a new shape or other condition that effectively renders that object effectively "new" (for example, broken objects such as half a cup or a partially dismantled chair may not be recognizable in their less-than-whole form). As an immediate end result, it is unlikely that a fielded image recognition platform (such as, but not limited to, a smart camera) will always have sufficient locally available image recognition facilitation content to ensure that its primary functionality can be adequately served at all times and under all circumstances.

BRIEF DESCRIPTION OF THE DRAWINGS

The above needs are at least partially met through provision of the image recognition facilitation using remotely sourced content described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, upon determining a need for image recognition facilitation content in order to process an image, and further upon determining that such image recognition facilitation content is not locally available, a remote resource is accessed and corresponding image recognition facilitation content is received therefrom (or from another remote resource). This remotely sourced image recognition facilitation content can then be used to process the image.

Depending upon the embodiment and application, the image itself can be locally captured or provided from a remote source. In an optional but preferred approach such accessing occurs via a wireless communication link.

The image recognition facilitation content itself can vary with the needs and requirements of a given setting and application. Illustrative examples of such content include comparative image data (including but not limited to object models), image recognition processing instructions, classifiers, and characterizing information regarding at least one corresponding image (such as, for example, links between image content and a corresponding identifying taxonomy or other data schema), to name a few.

So configured, those skilled in the art will appreciate that a given image processing platform, notwithstanding a possibly limited native storage capability and/or an encounter with an unfamiliar object, can gain ready access to content that will facilitate the successful recognition of a given object that is otherwise presently unknown to that platform. This capability can be further leveraged in various useful ways. As but one of many examples, the image processing platform can be pre-loaded with remotely sourced supplemental image recognition facilitation content as corresponds to objects that are likely to be subsequently encountered by the platform (as based, for example, upon a present object being recognized by the platform).

Figure 1:
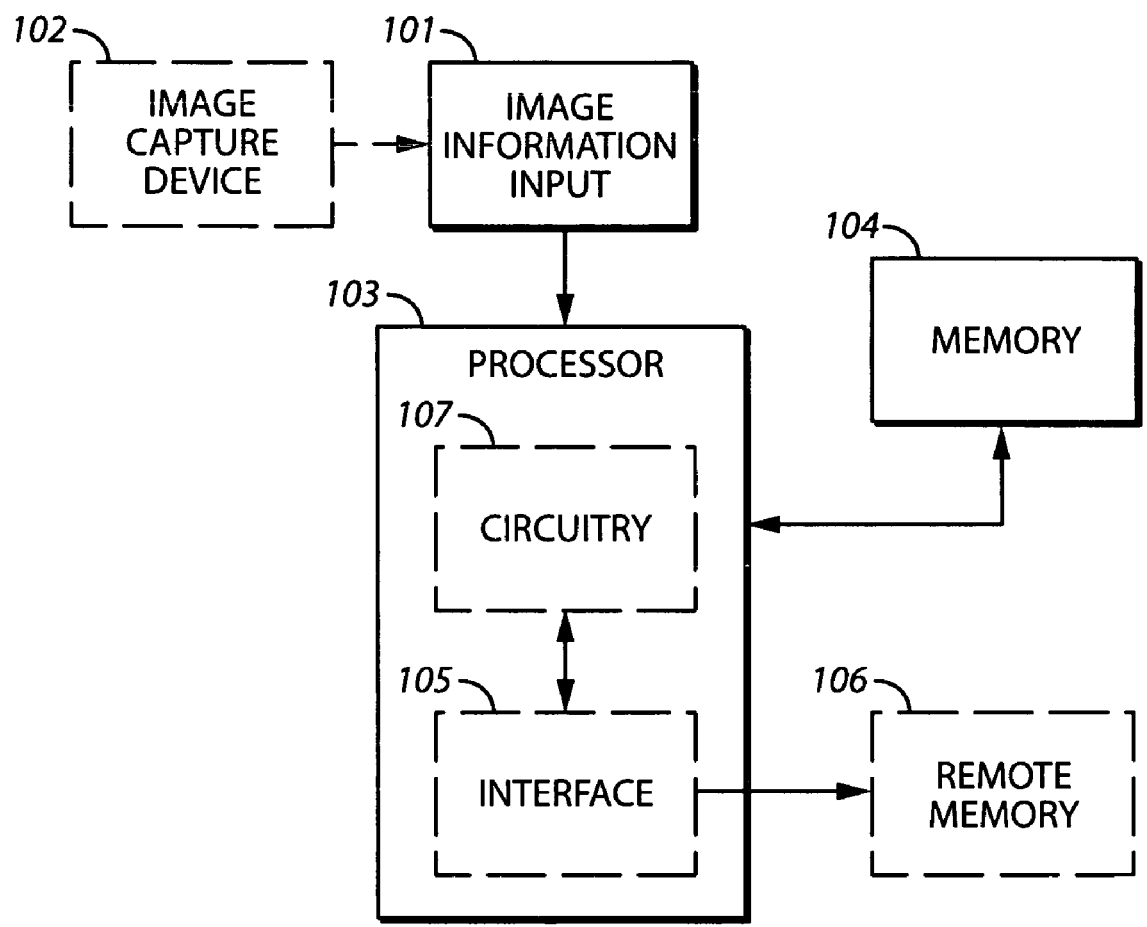
FIG. 1 comprises a block diagram as configured in accordance with various embodiments of the invention.

These and other benefits may become clearer upon making a thorough review and study of the following detailed description. Referring now to the drawings, and in particular to FIG. 1, an apparatus 100 may comprise, for example and in accordance with some embodiments of the present invention, an image capture device (such as a smart camera) or a captured image processing platform including but not limited to an image recognition facilitation content server. In this illustrative embodiment the apparatus 100 comprises an image information input 101 that can operably couple to a locally or remotely disposed image capture device 102 (such as one of any number of digital cameras and video capture devices as are presently available or as are hereafter developed). This image information input 101 in turn operably couples to a processor 103 that serves, in part, to effect an image recognition process of choice to thereby at least attempt to recognize at least some part of the captured images as are input via the image information input 101.

The processor 103 operably couples to a memory 104 that preferably, though not necessarily, comprises a local, and even an integrally situated, storage platform. As depicted, the memory 104 can comprise a solitary platform. Those skilled in the art will recognize, however, that such a memory 104 can in fact also comprise a plurality of storage elements including storage elements of differing types. In a preferred approach this memory 104 may have image recognition facilitation content stored therein. Also in a preferred (though not required) approach this memory 104 further has available capacity to store supplemental image recognition facilitation content as well. (As will be discussed below, it is also contemplated that at least some of the local image recognition facilitation content may be purged and discarded from time to time. This may be appropriate when the information itself is stale or otherwise unneeded and/or when additional capacity is required to receive and store additional remotely sourced image recognition facilitation content.) And again, as already noted above, such content can comprise any useful facilitation content including, but not limited to, comparative image data, image recognition processing instructions, and/or characterizing information regarding one or more corresponding images.

Also in a preferred approach this processor 103 further comprises an interface 105 that can operably couple to a remote memory 106 (which remote memory 106 has at least some supplemental image recognition facilitation content stored therein) and circuitry 107 to effect, amongst such other functionality as may be desired and/or appropriate in a given setting, a query of the remote memory 106 via the interface 105 when the memory 104 does not have suitable image recognition facilitation content to permit reliable recognition of an image as has been received via the image information input 101.

So configured, the apparatus 100 is capable of receiving a captured image and of attempting to recognize at least some portion of that image using image recognition facilitation content from its available memory 104. When this proves inadequate, however, the apparatus 100 is then capable of contacting a remote memory 106 and querying that remote memory 106 for additional image recognition facilitation content as will permit the apparatus 100 to effect recognition of the present (and/or a future) image. More particularly, such an apparatus 100 can be readily configured to support the following described processes (though persons skilled in the art will appreciate that the following described steps and actions can be realized using other implementing structure if so desired and that these teachings are not limited to the specific illustrative embodiments presented above).

Figure 2:
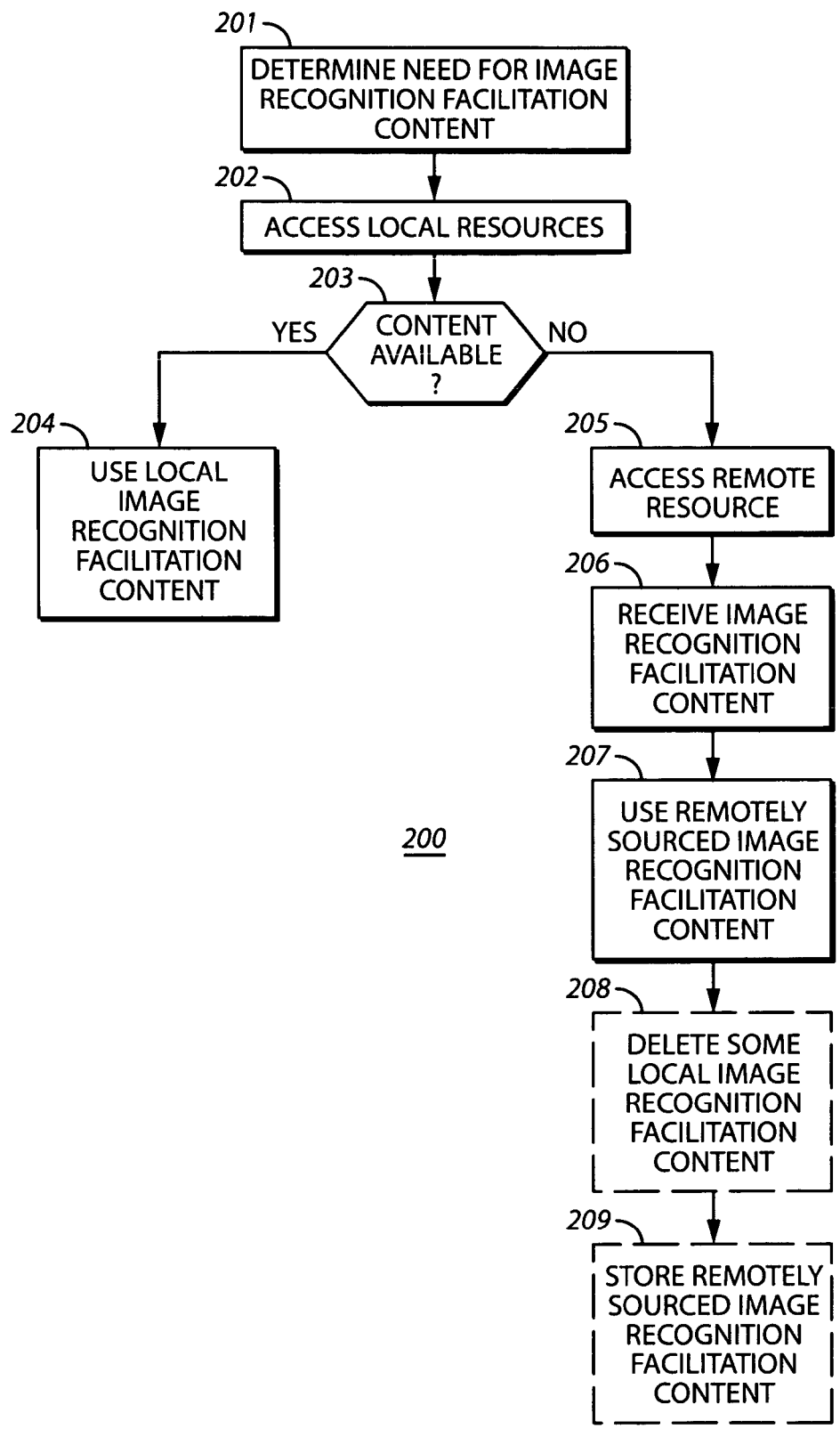
FIG. 2 comprises a flow diagram as configured in accordance with various embodiments of the invention.

Referring now to FIG. 2, a corresponding process 200 can begin upon determining 201 the existence of a need for image recognition facilitation content. Such a determination can be based upon or otherwise triggered by a wide variety of instances. For example, this determination can be based, at least in part, upon receiving a captured image (either via a native image capturing capability or as received from a remote source). The image itself preferably comprises a digitized image using any of a wide variety of image formats, including but not limited to Tagged Image File Format (TIFF), Joint Photographic Experts Group format (JPEG), and standard bitmapping formats, to name but a few. These teachings are also compatible for use with monochromatic images, natural color images, or other special case images (such as, but not limited to, infrared images, ultrasound images, X-ray images, magnetic resonance images, and so forth).

Upon determining 201 this need, this process 200 then accesses 202 local resources to determine 203 whether applicable image recognition facilitation content is locally available. This image recognition facilitation content can comprise, for example, object models that serve to effect identification, categorization, differentiation, and/or other like points of discernment with respect to the content of the received captured image. (Object models and their use comprise a generally well-understood area of practice. Therefore, for the sake of brevity and the preservation of narrative focus no further elaboration regarding such models will be provided here.) As noted above, such image recognition facilitation content can comprise other information as well such as but not limited to classifiers.

This determination 203 regarding the availability and/or sufficiency of local resources can be based upon any of a wide variety of decision-making criteria. As one example, the implementing apparatus can attempt to employ each available item of image recognition facilitation content (such as each available object model) in an attempt to identify the captured image (or some portion thereof). It is known to characterize such comparisons with a corresponding metric that suggests a degree to which the image content matches the facilitation content.

For example, a first locally available object model as corresponds to a ball might match a given captured image with a 7% degree of correspondence while a second object model as corresponds to a shoe might match that same captured image with an 80% degree of correspondence. In such a case, the degree of confidence that the image comprises a shoe may be considered sufficiently high that this process can reasonably conclude that the locally available image recognition facilitation content is adequate. In such a case, this process 200 will support usage 204 of that local image recognition facilitation content to serve immediate image recognition needs.

As another example, the first locally available object model as corresponds to a ball might again match a given captured image with a 7% degree of correspondence while the second object model as corresponds to a shoe might match that same captured image with an 18% degree of correspondence. In such a case, while it is more likely that the captured image comprises a shoe rather than a ball, the level of confidence regarding either conclusion is sufficiently low that this process could conclude that adequate local image recognition facilitation content is not, in fact, available. In such a case this process 200 supports accessing 205 a remote resource.

This access can be effected using a wireless communication path (such as a cellular telephony bearer, a wireless local area network (such as but not limited to an 802.11 or 802.16 family network), a Bluetooth bearer, and so forth) and/or a wired path (wherein "wired" is understood to encompass all physical conduits including electrical conductors, light conductors, and so forth).

The establishment and conduct of such a communication can be based upon any of a wide variety of presently available technologies and others will no doubt be available in the future. Given the relative ubiquity of such alternatives, and further given that these teachings are not overly sensitive to the selection of any particular one of these alternatives, further elaboration regarding such a communication path need not be provided here.

The remote resource itself can also comprise any of a wide variety of entities, including but not limited to an image recognition facilitation content server (i.e., a network entity that stores and/or maps access to a variety of facilitation content). Upon being accessed 205, this remote resource will preferably provide access to that image recognition facilitation content. This can be accomplished in any of a variety of ways.

As one example, such a remote resource can simply download to an inquiring entity all of its available facilitation content. To illustrate, a remote resource of this ilk having, for example, 100 object models, could simply download, in bulk, all of these object models to the querying entity.

As another example, such a remote resource could receive from the inquiring entity a copy of the captured image (or some portion thereof). This image could then be processed by the remote resource using its available image recognition facilitation content to determine, for example, whether any of its available facilitation content produces a recognition result having a sufficiently acceptable level of confidence. Upon determining that one or more elements of its available image recognition facilitation content yields such a result, the remote resource could then download to the inquiring entity only that corresponding image recognition facilitation content.

Other possibilities exist as well. For example, the process 200 itself may be able to locally make a general determination regarding a given captured image but then be unable to attain a desired degree of identification resolution with respect to that conclusion. To illustrate, locally available image recognition facilitation content may be able to establish that a given captured image comprises an automobile but is otherwise unable to ascertain, for example, the make and/or model of the automobile. In such a case, the process 200 can provide such corresponding characterizing information when accessing 205 the remote resource. The remote resource, in turn, can then use such characterizing information (for example, that the captured image of concern comprises an automobile) to select a corresponding subset of its image recognition facilitation content (i.e., in this example, that content which corresponds to details regarding automobiles) to provide to the inquiring entity.

This process 200 provides for the receipt 206 of such image recognition facilitation content from the remote resource and for the subsequent use 207 of that content to process the captured image. As already noted above, this may, if desired, comprise receiving, for example, a single object model or a plurality of object models (which plurality may or may not all relate to a common point of correspondence to one another).

In some cases it may be desirable or otherwise appropriate to use the received image recognition facilitation content and to then discard it immediately subsequent to such use. In other cases, however, it may be helpful and useful to persist the local availability of such remotely sourced image recognition facilitation content. Such persistence is relatively easy to accomplish when local memory as is available to the process 200 has sufficient open capacity to retain such information. In other cases, when such capacity is insufficient, it may be necessary to optionally delete 208 at least some of the image recognition facilitation content from local resources. The deleted information can comprise original local content and/or information as had been previously also received from a remote resource.

Various criteria can be employed to select the particular image recognition facilitation content to be so deleted. As one simple example the content to be deleted can be randomly selected. As a perhaps more viable approach a record of usage can be retained for some or all of the locally stored content. The least-used content can then be selected for deletion when such deletion 208 is called for. It would also be possible, of course, to mark or tag certain elements of such content to protect such elements from deletion regardless of their respective frequency of usage. Such protection could be employed to ensure, for example, that certain important objects are always likely to be locally recognized notwithstanding that such objects are not necessarily encountered with any frequency.

Regardless of whether local content is deleted 208, this process 200 can also optionally effect the storage 209 of the remotely sourced image recognition facilitation content using local resources (such as a locally available and accessible memory). Stored in this manner the remotely attained image recognition facilitation content can then be later employed as locally available recognition resources when processing subsequently received captured images. This, of course, will reduce the need in such an instance to access a remote resource and therefore likely decrease the cycle time required for a given captured image to be suitably recognized.

Figure 3:
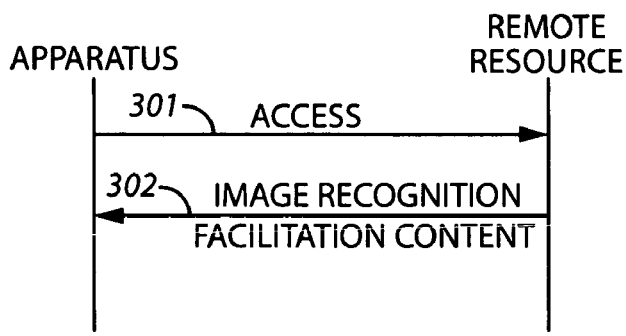
FIG. 3 comprises a signal flow diagram as configured in accordance with various embodiments of the invention.

The "remote resource" as described above can, and should, be viewed as a logical representation and/or a distributed resource. To illustrate, and referring now to FIG. 3, a given apparatus can access 301 a first remote resource as described above and receive from that first remote resource corresponding image recognition facilitation content 302.

Figure 4:
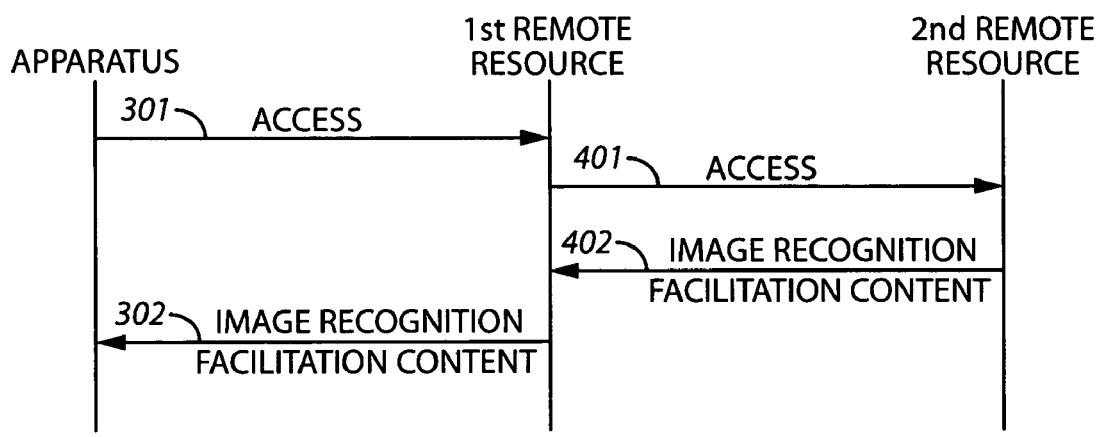
FIG. 4 comprises a signal flow diagram as configured in accordance with various embodiments of the invention.

It is also possible that this first remote resource, when itself lacking relevant image recognition facilitation content, can act as a proxy for one or more other remote resources that do have useful content. To illustrate, and referring now to FIG. 4, upon being accessed 301 by an initiating apparatus, the first remote resource, upon determining its own inability to provide an adequate substantive response, can itself access 401 one or more other resources such as the second remote resource suggested in the drawing. This second remote resource can then respond to this inquiry with relevant image recognition facilitation content 402 that the first remote resource then forwards on to the inquiring apparatus as its own response 302.

Figure 5:
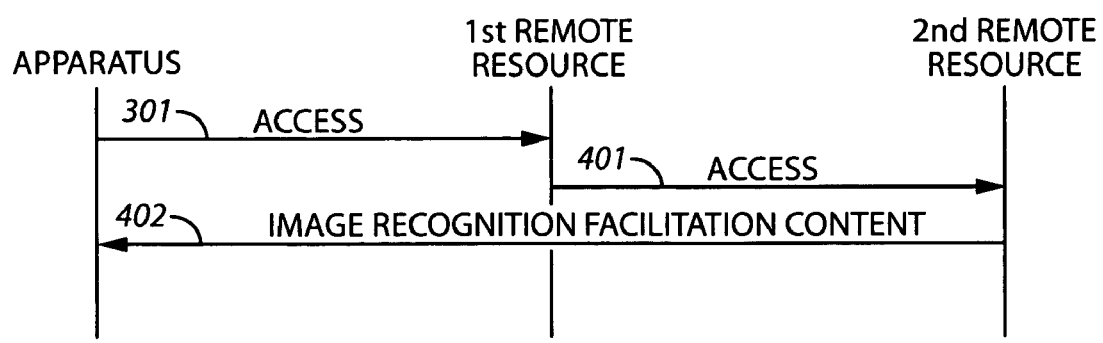
FIG. 5 comprises a signal flow diagram as configured in accordance with various embodiments of the invention.

In the above illustrative example, the first-contacted remote resource effectively acts as a proxy. It would also be possible to facilitate a more direct relationship between the inquiring apparatus and the more removed remote resource that has the desired image recognition facilitation content. To illustrate, and referring now to FIG. 5, the image recognition facilitation content 402 as sourced by the second remote resource can be provided directly to the inquiring apparatus rather than via the first remote resource. This can be accommodated, for example, by having the first remote resource provide an address or other communication context information for the inquiring apparatus to the second remote resource.

Those skilled in the art will recognize that these examples are illustrative in nature and are not intended as an exhaustive presentation of all relevant related possibilities. For example, there is no particular upper limit on the number of remote resources that may be accessed in ultimate response to an initial access and inquiry by a given apparatus. As another example, it would also be possible for some remote resources to themselves respond directly to the inquiring unit (rather than routing their responses via a proxy remote resource) while other remote resources to provide their responses indirectly via one or more remote resources that act as a proxy in this regard. And as yet another example, the first remote resource in the above examples might provide a link to the inquiring apparatus, which link will lead the apparatus to a specific other remote resource that has (or likely has) relevant image recognition facilitation content.

These teachings are compatible and/or enabling with respect to a number of embellishments and alternative approaches. For example, the image recognition facilitation content as provided by a remote resource can be prospective in nature rather than immediately relevant to a given received captured image. To illustrate, a given captured image might depict a stapler on a desk. A remote resource, upon identifying a suitable element of image recognition facilitation content for this substantive image content might then use characterizing information regarding that substantive image content to identify other content (such as other model objects) for other objects that one might ordinarily encounter if one is also encountering staplers. For example, such a remote resource, upon recognizing the image content as including a stapler, might push additional image recognition facilitation content to the inquiring apparatus as corresponds to a tape dispenser, pens, pencils, books, portfolios, telephones, computer keyboards, displays, and cursor manipulation devices, and so forth. By anticipating the likely recognition needs of a given inquiring apparatus in this manner one may reduce the cycle time required to effect successful recognition of subsequently received image content.

As another example, these teachings may be employed in a manner that facilitates development of a relevant (albeit possibly distributed) database of image recognition facilitation content such as object models. To illustrate, captured images for which a given remote resource is ultimately unable to provide relevant image recognition facilitation content can be stored and/or forwarded for subsequent use by institutional and/or open source personnel. For example, a new style of parking meter may be deployed in a given municipality. Captured images of that parking meter may have met with frustrated results in that no image recognition facilitation content available (locally or remotely) to a given remote resource may have resulted in a satisfactory recognition of the parking meter as a "parking meter." By storing such captured images in a manner that identifies such images as containing unrecognized content, humans (or possibly other more capable computer processing platforms) can review such images and develop image recognition facilitation content (such as relevant object models) that permit subsequent effective recognition of such parking meters.

These teachings are compatible for use in a wide variety of settings but are clearly of value when deployed in conjunction with smart cameras. In particular, these teachings leverage the native processing capability of such a platform while also ameliorating the impact associated with the typically limited local storage capability of such platforms. This, in turn, permits a given device having only modest storage capability to nevertheless often, if not always, have a ready store of useful and relevant image recognition facilitation content to employ when accessing captured images.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, although the above-described examples concern still images, these same teachings are also applicable for use with video clips.

I claim:

1. A method used in a processor based image capture apparatus, comprising:
    accessing local resources to determine whether image recognition facilitation content is locally available to process an image containing an object;
    when the image recognition facilitation content is locally available, using the image recognition facilitation content to process the image and recognize the object;
    when the image recognition facilitation content is not locally available:
    accessing a first remote resource;
    receiving from the first remote resource additional image recognition facilitation content that corresponds to other objects that one might ordinarily encounter when encountering the object that is recognized in the Image;
    using the additional image recognition facilitation content from the remote resource to process a subsequently received image.

2. The method of claim 1 wherein the image comprises a captured image.

3. The method of claim 2 further comprising capturing the image.

4. The method of claim 3 wherein capturing the image further comprises capturing the image local to the local resources.

5. The method of claim 3 wherein capturing the image further comprises capturing the image remote to the local resources.

6. The method of claim 1 wherein accessing a first remote resource further comprises accessing a first remote resource using a wireless communication path.

7. The method of claim 1 wherein the image recognition facilitation content further comprises at least one object model.

8. The method of claim 1 wherein the image recognition facilitation content comprises at least one of:
    comparative image data;
    image recognition processing instructions;
    characterizing information regarding at least one corresponding image.

9. The method of claim 1 and further comprising:
    locally storing the additional image recognition facilitation content from the remote resource.

10. The method of claim 1 wherein receiving from a first remote resource the additional image recognition facilitation content further comprises receiving additional image recognition facilitation content as corresponds to a plurality of different objects.

11. The method of claim 1 further comprising:

storing as a local resource at least some of the additional image recognition facilitation content as received from the first remote resource.

12. An image capture apparatus, comprising:

a memory having first image recognition facilitation content stored therein and having available capacity to store additional image recognition facilitation content;

an image information input;

a processor operably coupled to the image information input and to the memory and responsive to a set of programmed instructions stored in the image capture apparatus to:

access the memory to determine whether the first image recognition facilitation content is suitable to process an image received by the image information input that comprises an object;

when the first image recognition facilitation content is suitable, use the first image recognition facilitation content to process the image and recognize the object;

when the firsts image recognition facilitation content is not suitable:

access a first remote resource that is external to the image capture apparatus;

receive from the first remote resource additional image recognition facilitation content that corresponds to other objects that one might ordinarily encounter when encountering the object that is recognized in the Image;

store the additional image recognition facilitation content in the memory; and use the additional image recognition facilitation content from the remote resource to process a subsequently received image.

\* \* \* \* \*